(12) United States Patent
Brink et al.

(10) Patent No.: US 7,764,742 B2
(45) Date of Patent: Jul. 27, 2010

(54) NOTCH FILTERING FOR OFDM SYSTEM WITH NULL POSTFIX

(75) Inventors: Stephan ten Brink, Irvine, CA (US); Ravishankar H. Mahadevappa, Irvine, CA (US)

(73) Assignee: Realtek Semiconductor Corp., Hsinchu (TW)

(*) Notice: Subject to any disclaimer, the term of this patent is extended or adjusted under 35 U.S.C. 154(b) by 0 days.

(21) Appl. No.: 11/846,484

(22) Filed: Aug. 28, 2007

(65) Prior Publication Data
US 2008/0056395 A1 Mar. 6, 2008

Related U.S. Application Data

(60) Provisional application No. 60/840,870, filed on Aug. 29, 2006.

(51) Int. Cl.
*H04L 27/28* (2006.01)
*H04J 11/00* (2006.01)
(52) U.S. Cl. .................................. 375/260; 370/210
(58) Field of Classification Search .............. 375/132, 375/133, 135, 141, 146, 260, 261; 370/208, 370/210, 335, 342; 708/403, 404
See application file for complete search history.

(56) References Cited

U.S. PATENT DOCUMENTS 6,473,438 B1* 10/2002 Cioffi et al. ................ 370/468
6,657,950 B1* 12/2003 Jones et al. ................ 370/208
7,016,425 B1* 3/2006 Kraiem ...................... 375/261
2003/0103579 A1* 6/2003 Webster et al. ............. 375/298
2004/0047285 A1* 3/2004 Foerster et al. ............ 370/210
2006/0039273 A1* 2/2006 Gore et al. ................. 370/208
2006/0050624 A1* 3/2006 Akita ........................ 370/208
2007/0058693 A1* 3/2007 Aytur et al. ................ 375/130
2007/0076813 A1 4/2007 Haartsen
2007/0217490 A1* 9/2007 Blake et al. ................ 375/222

OTHER PUBLICATIONS

Written Opinion of the International Searching Authority for International Application No. PCT/US2007/077099, filed Aug. 29, 2007, Written Opinion dated Jun. 4, 2008 and mailed Jul. 7, 2008 (7 pgs.).
International Search Report for International Application No. PCT/US2007/077099, filed Aug. 29, 2007, International Search Report dated Jun. 4, 2008 and mailed Jul. 7, 2008 (4 pgs.).

* cited by examiner

*Primary Examiner*—Young T. Tse
(74) *Attorney, Agent, or Firm*—Thomas, Kayden, Horstemeyer & Risley

(57) ABSTRACT

Transmission systems and methods for reducing interference by wideband communication systems with narrowband communications systems are disclosed. In some embodiments an ultrawideband system employing orthogonal frequency division multiplexing (OFDM) with a null post-fix nulls symbols for sub-carriers at potentially interfering frequencies prior to transformation to the time domain and filters a time domain representation using a notch filter to further reduce spectral components at the potentially interfering frequencies. In further embodiments pre-emphasis is applied to a frequency domain representation of symbols to reduce ripples introduced by the notch filter.

15 Claims, 10 Drawing Sheets

NOTCH FILTERING FOR OFDM SYSTEM WITH NULL POSTFIX

CROSS-REFERENCE TO RELATED APPLICATION(S)

This application claims the benefit of the filing date of U.S. Provisional Patent Application No. 60/840,870, filed Aug. 29, 2006, the disclosure of which is incorporated by reference herein.

BACKGROUND OF THE INVENTION

The present invention relates generally to wide band communication systems, and more particularly to interference avoidance in a wide band communication systems.

Wide band communication systems are useful in that they allow data to be transferred over a range of frequencies, potentially increasing data throughput as well as potentially increasing robustness of communications. Wide band communication systems and particularly ultrawideband communication systems, may use, for example, orthogonal frequency division multiplexing (OFDM) for transmission of symbols over a range of frequencies, often referred to as subcarriers. Ultrawideband systems may further increase the frequencies at which data is transmitted, for example by periodically switching, sometimes referred to as hopping, between different bands of frequencies. Using different frequency hopping patterns, often indicated by a time frequency code, a number of transmitter receiver pairs may utilize the same bandwidth simultaneously.

A disadvantage of the use of widebands of frequency for communications is that portions of the bandwidth may already be reserved for utilization by other communication systems. These other communication systems may interfere with the wideband transmissions and the wideband transmissions may interfere with transmissions of the other communication systems. As a practical matter, the other communication systems often have prior rights to the particular frequencies which they use, and ultrawideband transmitters may be required to not interfere with communications by others over those frequencies.

Avoiding interfering with other communication systems may be problematic at times. For example, different locations may have different reserved frequency bands. Moreover, the reserved frequency bands may not be in use in all places or at all times. Thus, in many instances it may be that for a large majority of the time communication over those reserved frequencies may be properly accomplished by UWB transmitters, allowing for increased bandwidth, so long as those UWB transmitters may avoid interference when those frequency bands are in use by the other communications systems.

BRIEF SUMMARY OF THE INVENTION

The invention provides for transmission in wide band communication systems. In one aspect the invention provides a transmitter for a frequency division multiplexing system, comprising a tone nuller block to null symbols or portions of symbols representative of potentially interfering subcarriers of a frequency division multiplexed symbol; an inverse Fast Fourier Transform (iFFT) block to tranform information indicative of the frequency division multiplexed symbol with nulled subcarriers to a time domain representation; and a notch filter to filter at least portions of the time domain representation about the interfering subcarriers.

In another aspect the invention provides a method of processing symbols in a frequency division multiplexing system in order to reduce interference with other communication systems, comprising nulling information for subcarriers, in the frequency domain, intended for transmission at frequencies indicated as being used by other communication systems, the information for the subcarriers being part of a frequency division multiplexing symbol; transforming a representation of the frequency division multiplexing symbol with nulled subcarriers to a time domain representation; adding null symbols to the time domain representation; and filtering the time domain representation using a frequency selective filter so as to reduce signal components of subcarriers intended for transmission at the frequencies indicated as being used by the other communication systems.

In another aspect the invention provides a method of reducing interference by an ultrawideband orthogonal frequency division multiplexing (OFDM) communication system transmitter with narrowband communication systems, comprising receiving an indication of frequencies used by narrowband communication systems; nulling, in the frequency domain, information of an OFDM symbol otherwise expected to be transmitted at the frequencies used by the narrowband communication systems; and filtering, in the time domain, information of the OFDM symbol otherwise expected to be transmitted at the frequencies used by the narrowband communication systems.

These and other aspects of the invention are more readily comprehended upon review of this disclosure.

DETAILED DESCRIPTION

Figure 1:
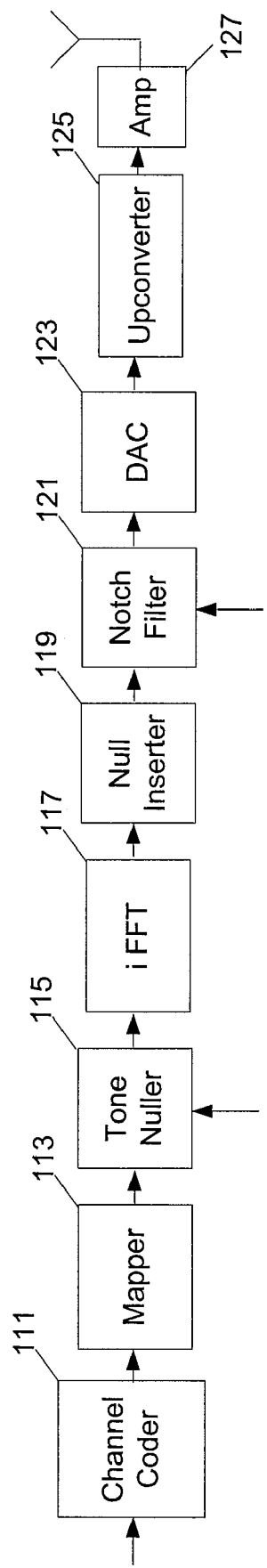
FIG. 1 is a block diagram of a transmitter in accordance with aspects of the invention.

FIG. 1 is a block diagram of a transmitter in accordance with aspects of the invention. Preferably, the transmitter receives a bit stream for frequency division multiplexing. Accordingly, the transmitter channel encodes the symbols of a received bit stream, interleaves bits or groups of bits of the symbols, maps or modulates the interleaved symbols, transforms the symbols to a time domain representation, converts the time domain representation to an analog signal, upconverts the analog signal to a carrier frequency, and transmits the upconverted amplified signal over at least one antenna. In many embodiments, the transmitter employs orthogonal frequency division multiplexing (OFDM).

As shown in FIG. 1, the transmitter includes a channel coder 111. The channel coder receives a bit stream from a source, for example a medic access controller (MAC). The channel coder performs channel coding and bit and/or symbol interleaving of the bit stream. In most embodiments, channel coding is performed separately than interleaving, with for example interleaving performed by an interleaving block, for ease of discussion, however these functions are combined in block 111. Channel encoding may be performed using, for example, a convolutional code of memory 6. The encoded bit stream is interleaved, for example, to reduce effects of bursty errors. The encoded interleaved symbols are received by a mapper 113. The mapper maps symbols, for example, using Quadrature Phase Shift Keying (QPSK) or Dual Carrier Modulation (DCM), a 16-QAM constellation, or some other constellation. An iFFT block 117 transforms the symbols to the time domain, for example, using a 128 point iFFT. A null inserter 119 inserts zeroes to the time domain samples. In many embodiments, zeroes are appended to the output of the iFFT, providing a null post-fix. In some embodiments, however, a null prefix is used instead. The time domain samples are converted to analog signals by a Digital Analog Converter (DAC) 123, upconverted to carrier frequency by upconverter 125, amplified by amplifier 127 and radiated via an antenna.

In many instances, it is desirable to not transmit symbols in particular frequencies in the range of frequencies over which symbols are being transmitted. Thus, in many instances a receiver associated with the transmitter may determine, through analysis of received signals, frequencies at which other transmitters are transmitting. In alternative embodiments, the Media Access Controller (MAC) or a table, possibly resident in the transmitter or memory accessible to the transmitter, may provide information as to particular frequencies over which no power should be transmitted.

In accordance with aspects of the invention, a tone nuller 115 is in the processing chain before the iFFT. The tone nuller nulls tones as indicated by a select signal, which provides information as to tones to null. The select signal may have information sourced by a MAC or as discussed above. Tone nulling in some embodiments is performed by replacing frequency domain symbols for particular frequencies, or tones, with zero magnitude symbols or by multiplexing those symbols by zero. The output of the iFFT, therefore, would normally be expected to have no frequency components at the nulled frequencies.

However, the insertion of a null post-fix by null inserter 119 limits the extent of reduction in output power approximate those frequencies. Accordingly, a notch filter 121 is also provided after insertion of the null post-fix, and prior to digital analog conversion. The notch filter filters a notch of frequencies as indicated by a select signal. The select signal may be the same select signal provided to the tone nuller.

In addition, in many embodiments the input to the DAC is first upsampled and filtered by a transmit FIR filter, with the upsampler unsampling the time domain sample normally by a factor of two, and the FIR filter implementing a low-pass filter.

Figure 2:
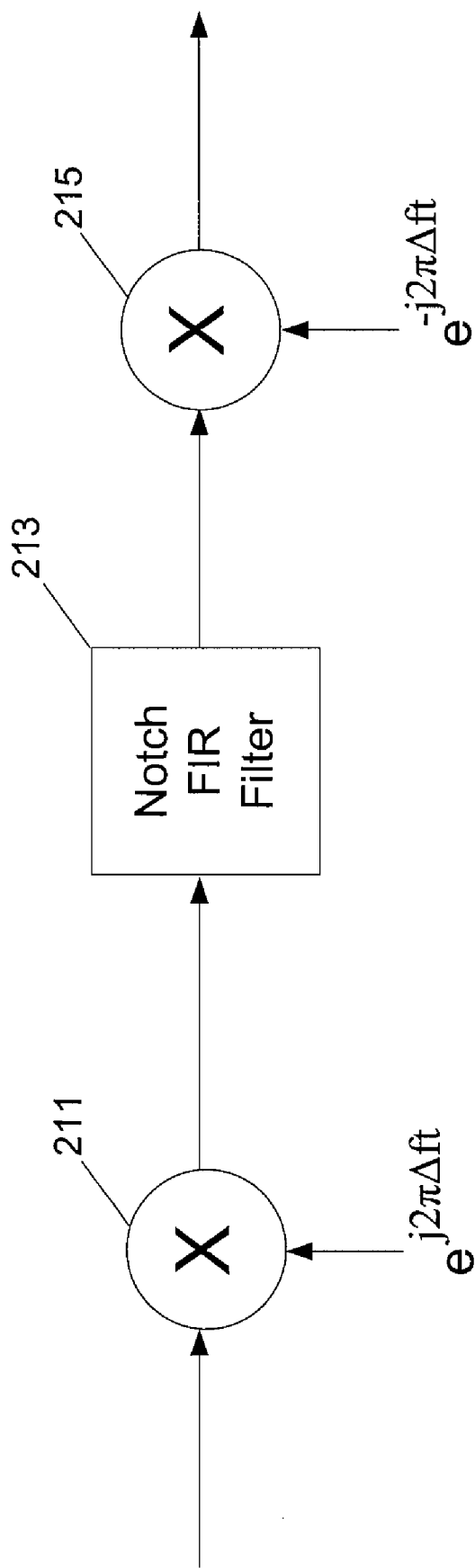
FIG. 2 is a block diagram of a notch filter with phase shifting.

An example of an embodiment of a notch filter is provided in FIG. 2. A signal is frequency shifted by a $\Delta f$ via complex multiplier 211. The shifted signal is filtered by a FIR filter 213. Preferably, the FIR filter is implemented as a low-pass filter. The output of the FIR filter is received by a further complex multiplier 215, with the further complex multiplier frequency shifting the filter output in the reverse of the manner of the complex multiplier 211, so as to frequency shift the signal by $-\Delta f$.

Figure 3A:
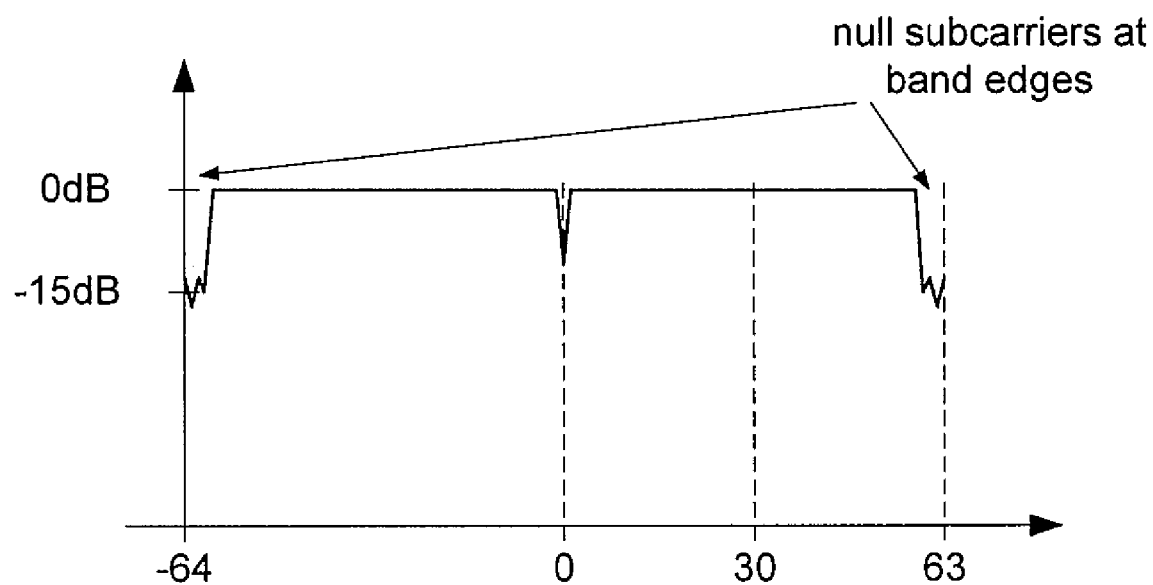
FIGS. 3*a*-3*d* are charts showing a form of operation of a phase shifting notch filter.
Figure 3B:
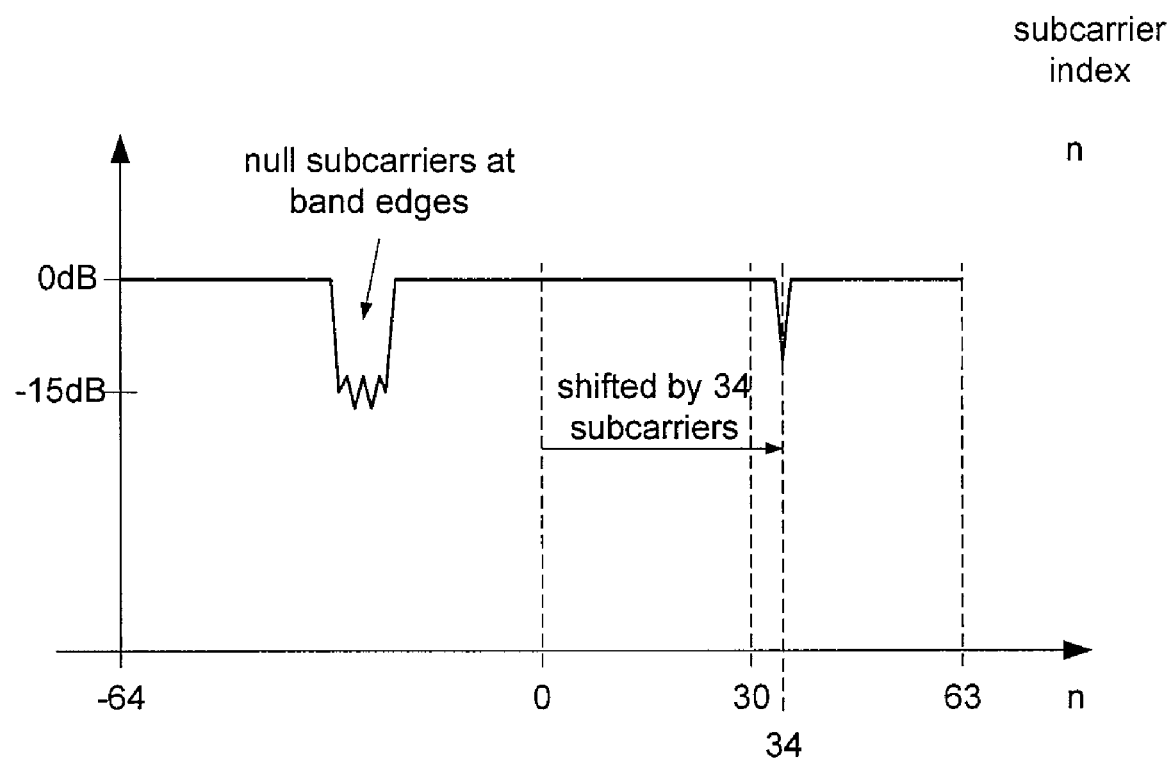

FIGS. 3a through 3d provide an illustrative overview of operation of notch filter of FIG. 2. FIG. 3a shows an example spectrum, indexed by subcarrier, of a signal to be filtered. The signal in FIG. 3a has subcarriers n=−64 ... 63, with n=−64, −63, −62, −61, 0, 62, and 63 set to zero.

As an example, a notch may be desired at subcarrier n=30. As a notch filter of FIG. 2 utilizes a low-pass filter in frequency shifting, the complex multiplier 211 shifts the spectrum by 64-n subcarriers, with n=30 in the example. Shifting the spectrum by 34 subcarriers places the subcarrier originally at index 30 at the band edges.

Figure 3C:
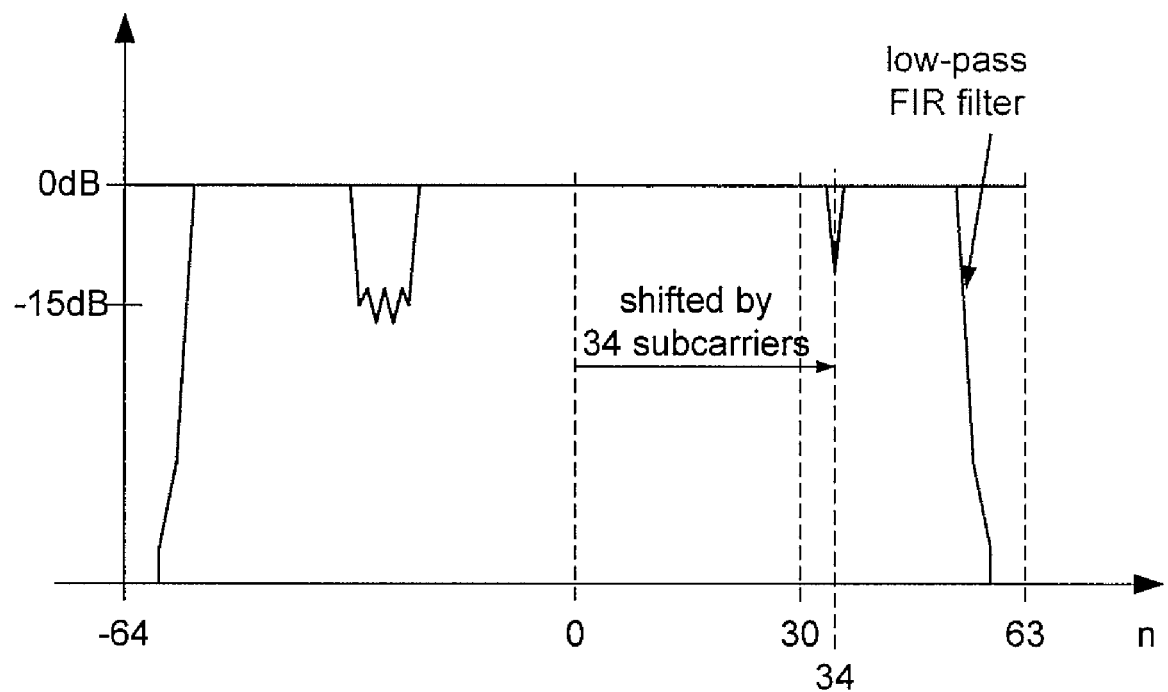
Figure 3D:
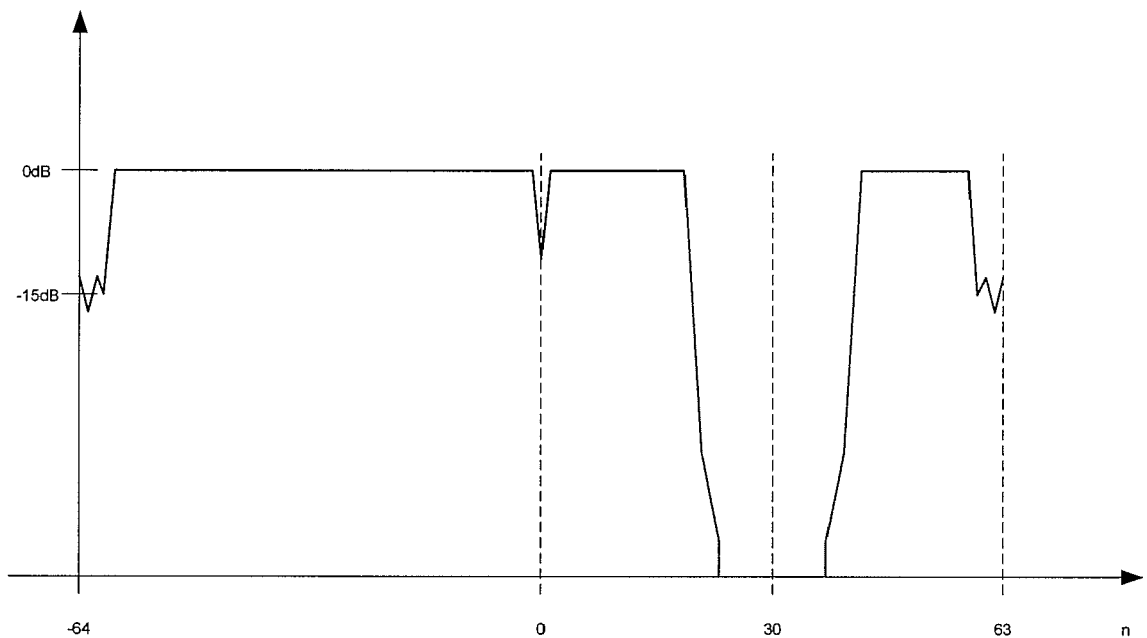

FIG. 3c shows the output of the low-pass FIR filter. As may be seen in FIG. 3c, signal components at the edge frequencies is significantly reduced. FIG. 3d shows the results of shifting the spectrum in a manner opposite of the first frequency shift, such that the edge frequencies were shifted back to be centered at subcarrier n=30. This may be seen in FIG. 3d as a notch appears in the spectrum about subcarrier n=30.

Figure 4:
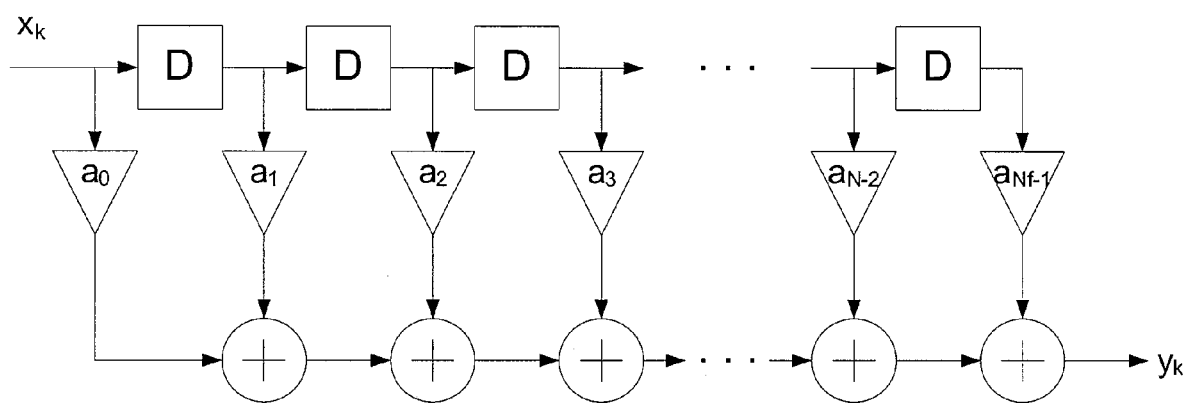
FIG. 4 is a block diagram of a FIR filter in accordance with aspects of the invention.

FIG. 4 shows an example of a FIR filter used in aspects of the invention. The filter includes a tapped delay line with $N_f$ taps. Each of the taps is each multiplied by a multiplier $a_k$, with k ranging from 0 to $N_{f-1}$. The taps are summed to provide an output of the filter. In one embodiment coefficients of the multipliers of the tapped delay line are chosen according to a truncated sinc-impulse, with $a_k = \sin(\pi x)/(\pi x)$ for $x \neq 0$, and $a_k = 1$ for x=0, wherein $$x = (k - (N_f - 1.0)/2.0)/(128/(128\text{-notch bandwidth})),$$

with notch bandwidth being a notch bandwidth in terms of number of subcarriers and $N_f$ being the number of filter taps In the foregoing, the 128 assumes a 128 point iFFT, depending on the number of points in the iFFT values x should be modified accordingly.

Of course, in different embodiments different filters structures may be used, for example, a structure including a folded tapped delay line, reducing the multipliers, may be used. In most embodiments, however, it is preferred that the impulse response of the filter be symmetric.

Figure 6:
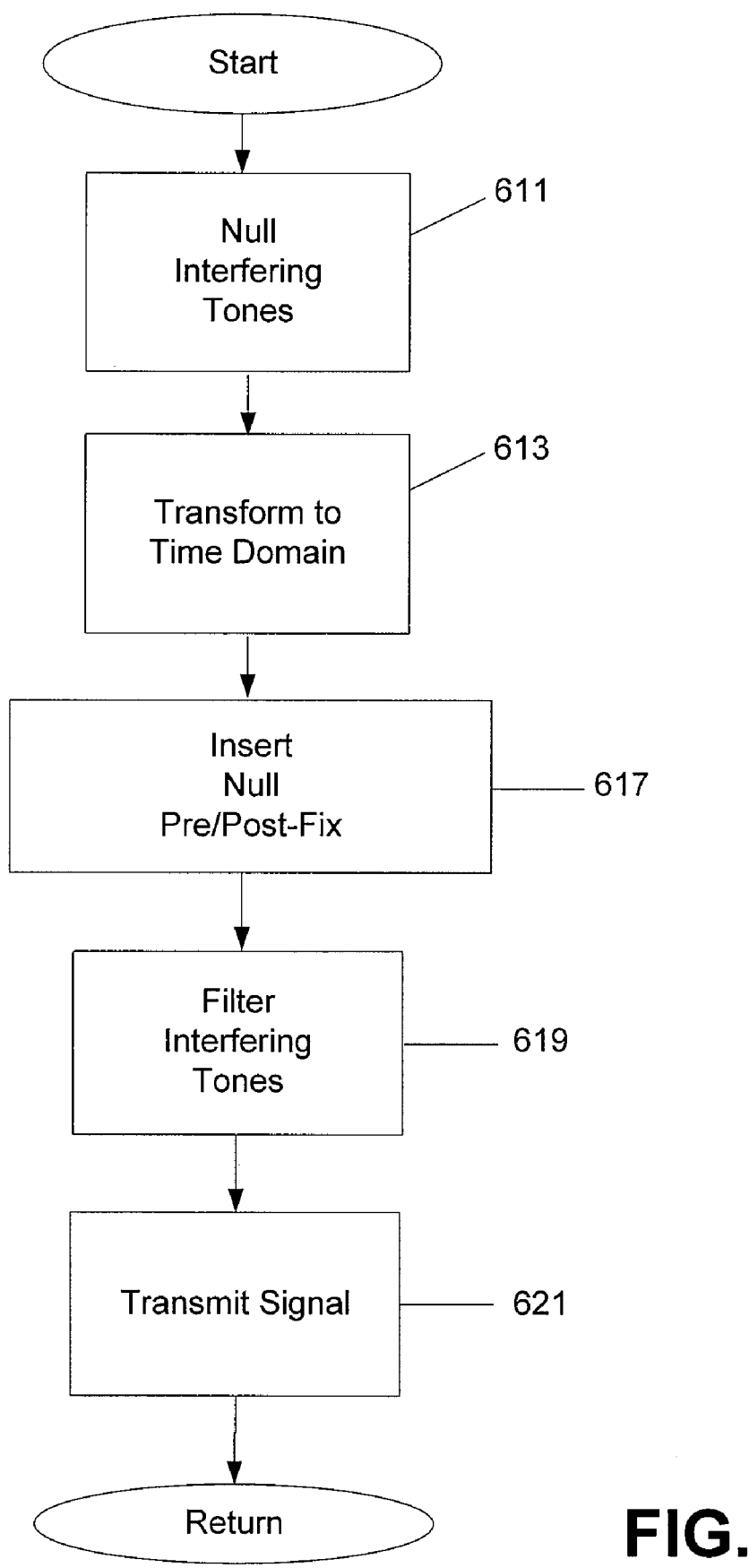
FIG. 6 is a flow diagram of a process for notching interfering tones in accordance with aspects of the invention.

FIG. 6 is a flow diagram of a process for reducing undesired frequency components in a frequency division multiplexing system. In block 611, symbols for subcarriers at interfering tones are nulled. In block 613, symbols in the frequency domain are transformed to a time domain representation. In block 617, null symbols are added to the time domain representation. In some embodiments, the null symbols are prepended to the time domain representation, but in most embodiments, the null symbols are appended as a post-fix to the time domain representation. In block 619, a filter is applied to the time domain representation to filter the interfering tones. In most embodiments, the filter is a notch filter. In some embodiments, the filter is an FIR low-pass filter with frequency shifting elements, which serves effectively as a notch filter by frequency shifting the time domain representation so that the interfering tones appear as high frequency components, and then re-frequency shifting the time domain representation back to its original position. In block 621 the signal is transmitted. The process thereafter returns.

Preferably, the notch FIR filter has only a small number of taps, for example 31 taps, to save power and silicon area in implementation. Unfortunately, truncation of the filter impulse response in the time domain, for example by using only 31 taps, results in ripples in the frequency domain, which may result in increased power spectral density for frequencies of interest.

Accordingly, in some embodiments, a pre-emphasis mask is applied to frequency domain symbols prior to transformation to time domain representations by the inverse fast Fourier transform block. A pre-emphasis mask may be determined by transforming a time domain impulse response of the notch filter into a frequency domain representation, and using the frequency domain representation to account for notch filter induced ripples. For example, the time domain impulse response of the notch filter may be $h_k$, k=0, ..., 127, with the frequency impulse response is $H_n$, n=0, ..., 127.

The pre-emphasis mask may therefore multiply each symbol for a subcarrier n, prior to iFFT, with $1/|H_n|$ with $|H_n|$ equal to sqrt $(real(H'')^2+imag(H_n)^2)$.

Figure 5:
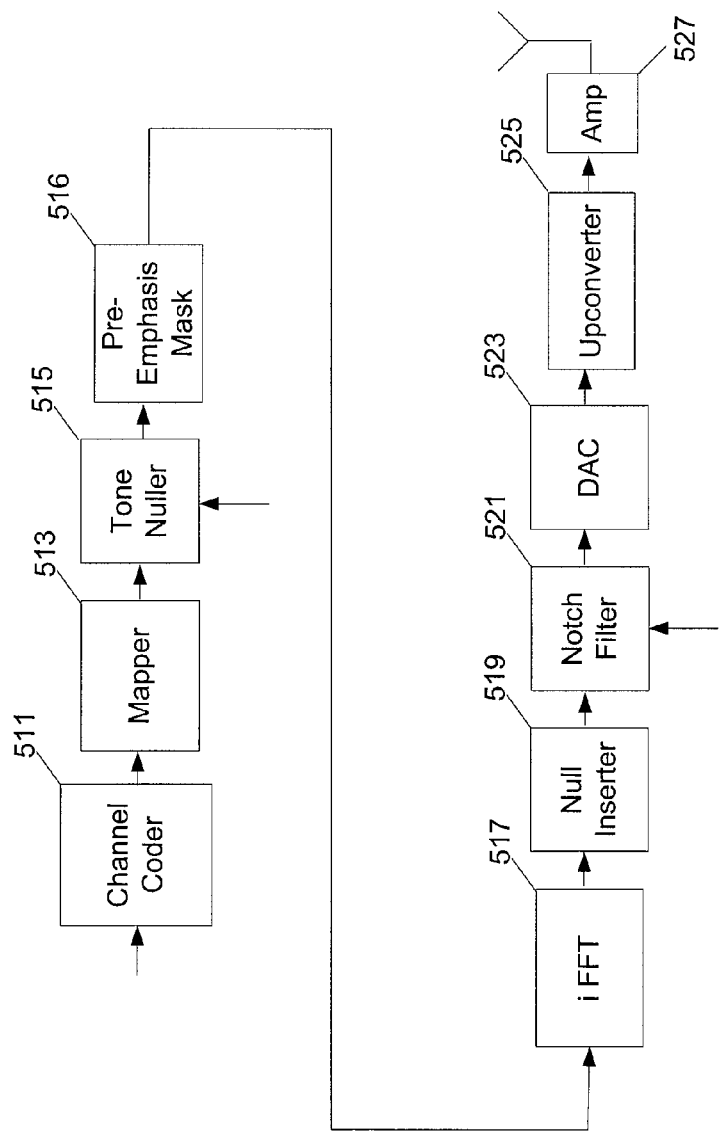
FIG. 5 is a block diagram of a further transmitter in accordance with aspects of the invention.

FIG. 5 is a block diagram of a further transmitter in accordance with aspects of the invention. As with the transmitter of FIG. 1, the transmitter of FIG. 5 includes a channel coder 511, a mapper 513, a tone nuller 515, an iFFT block 517, a null inserter 519, a notch filter 521, a digital to analog converter 523, an upconverter 525 and an amplifier 527 providing a signal to at least one antenna. As discussed with respect to FIG. 1, the channel coder encodes data for the transmission system, generally with a convolutional code of length 6. In addition, the channel coder, for ease of discussion, is also assumed to include an interleaver to reduce bursty errors. The mapper maps the encoded data to a symbol. The tone nuller nulls tones for particular subcarriers. The iFFT block transforms the frequency domain symbol to a time domain symbol, generally with a 128 point iFFT. The null inserter inserts a null post-fix. The notch filter notches the time domain representation of the signal to further decrease signal components at frequencies desired to be nulled. The DAC converts the time domain symbol to the analog domain. The upconverter upconverts the signal to appropriate transmission frequencies, and the amplifier amplifies the upconverted signal for transmission over the antenna.

In addition, after tone nulling, but before transforming the frequency domain symbol to a time domain representation, a pre-emphasis mask 516 reduces ripples expected to be present in the spectrum after utilization of the notch filter using a reduced number of taps. The pre-emphasis mask multiplies each symbol for a subcarrier n of the frequency domain signal by the inverse of the frequency domain impulse response of the notch filter.

Figure 7:
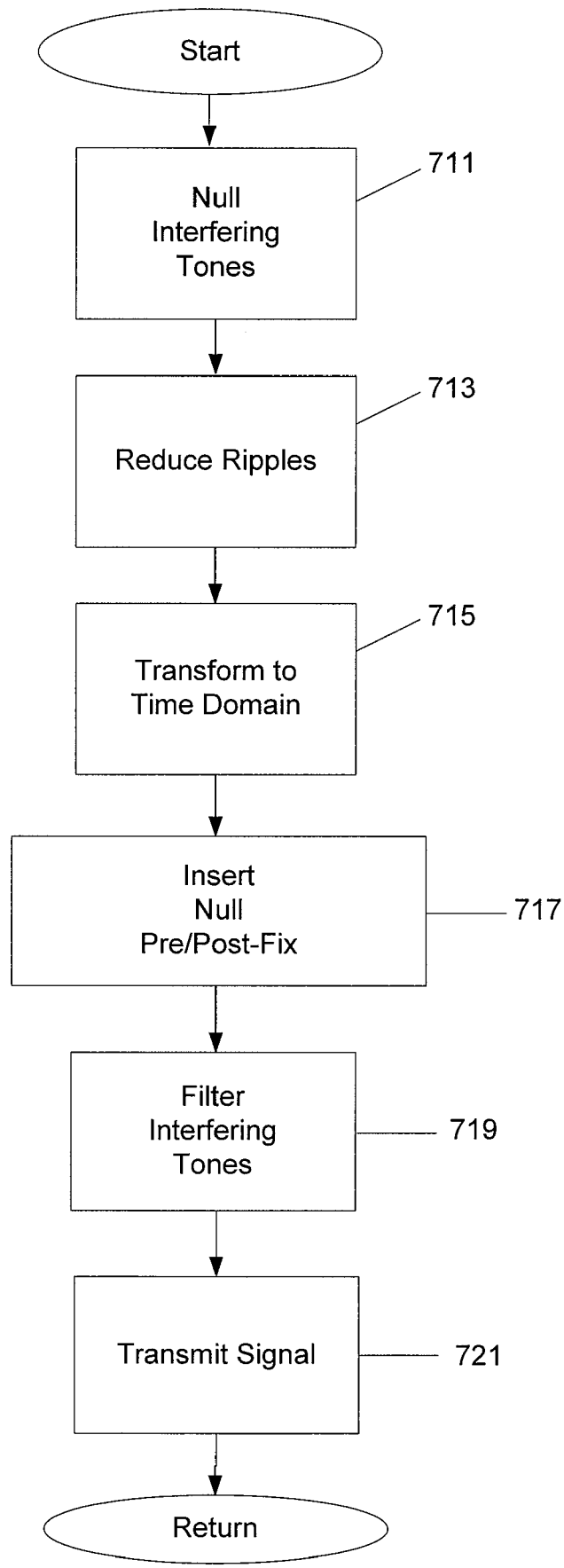
FIG. 7 is a further flow diagram of a process for notching interfering tones in accordance with aspects of the invention.

FIG. 7 is a further flow diagram of a process for removing signal components at interfering frequencies. In block 711, interfering tones of a frequency domain symbol are nulled. In block 713, a pre-emphasis mask is applied to the frequency domain symbol to reduce ripples in the frequency domain. In most embodiments, the mask is determined by determining a frequency impulse response of a filter later used to filter interfering tones from a time domain representation of the symbol, and using the frequency impulse response to adjust frequency domain representations of the symbols.

In block 715, the frequency domain symbol, after reduction of ripples, is transformed to the time domain. In block 717, a null pre-fix or null post-fix is pre-pended or appended, respectively, to the time domain representation. In block 719, interfering tones are filtered using a notch filter. In block 721 the signal is transmitted. The process thereafter returns.

Although the invention has been described with respect to certain specific embodiments, it should be recognized that the invention may be practiced otherwise than as specifically described. Accordingly, the invention should be viewed as the claims and their insubstantial variations supported by this disclosure.

What is claimed is:

1. A transmitter for a frequency division multiplexing system, comprising:
    a tone nuller block to null symbols or portions of symbols representative of potentially interfering subcarriers of a frequency division multiplexed symbol;
    an inverse fast Fourier transform (IFFT) block to transform information indicative of the frequency division multiplexed symbol with nulled subcarriers to a time domain representation; and
    a notch filter to filter at least portions of the time domain representation about the interfering subcarriers.

2. The transmitter of claim 1 wherein the notch filter includes a FIR filter.

3. The transmitter of claim 1 wherein the notch filter comprises a low pass FIR filter and frequency shifters.

4. The transmitter of claim 1 further comprising a pre-emphasis block configured to provide an emphasis to the frequency division multiplexed symbol with the nulled subcarriers, and the information indicative of the frequency division multiplexed symbol is the emphasized frequency division multiplexed symbol with the nulled subcarriers.

5. The transmitter of claim 4 wherein the pre-emphasis block is configured to provide the emphasis by effectively multiplying the frequency division multiplexed symbol with the nulled subcarriers by an inverse of a frequency domain impulse response of the notch filter.

6. The transmitter of claim 5 wherein the notch filter includes a delay line with thirty one taps.

7. The transmitter of claim 5 wherein the notch filter includes a tapped delay line with taps multiplied by coefficients in accordance with a truncated sinc impulse.

8. A method of processing symbols in a frequency division multiplexing system in order to reduce interference with other communication systems, comprising:
    nulling information for subcarriers, in a frequency domain representation, intended for transmission at frequencies indicated as being used by the other communication systems, the information for the subcarriers being part of a frequency division multiplexing symbol;
    transforming a representation of the frequency division multiplexing symbol with nulled subcarriers to a time domain representation;
    adding null symbols to the time domain representation;
    filtering the time domain representation with the added null symbols using a frequency selective filter so as to reduce signal components of the subcarriers intended for transmission at the frequencies indicated as being used by the other communication systems; and
    transmitting the processed symbols to reduce the interference with the other communication systems.

9. The method of claim 8 further comprising reducing ripples in a spectrum of the transmitted processed symbols, the ripples resulting from the filtering.

10. The method of claim 9 wherein reducing the ripples is performed by modifying at least portions of the frequency division multiplexing symbol in the frequency domain representation.

11. The method of claim 10 wherein modifying at least portions of the frequency division multiplexing symbol in the frequency domain representation comprises effectively multiplying the frequency division multiplexing symbol with the nulled subcarriers by an inverse of a frequency domain impulse response of the frequency selective filter.

12. The method of claim 11 wherein the frequency selective filter comprises a low pass FIR filter and frequency shifting.

13. A method of reducing interference by an ultrawideband orthogonal frequency division multiplexing (OFDM) communication transmitter with narrowband communication systems, comprising:
    receiving an indication of frequencies used by the narrowband communication systems;
    nulling, in a frequency domain representation, information of an OFDM symbol otherwise expected to be transmitted at the frequencies used by the narrowband communication systems; and filtering, in a time domain representation, information of the QFDM symbol otherwise expected to be transmitted at the frequencies used by the narrowband communication systems, thereby reducing the interference caused by the ultrawideband OFDM communication system transmitter.

14. The method of claim 13 wherein the filtering is performed by a filter, and further comprising effectively multiplying, in the frequency domain representation, information of the OFDM symbol by an inverse of a frequency domain impulse response of the filter, thereby reducing frequency spectrum ripples caused by the filtering.

15. The method of claim 13 wherein the filtering comprises frequency shifting the OFDM symbol by a first amount, low pass filtering the frequency shifted OFDM symbol, and frequency shifting the OFDM symbol in the direction reverse of the first amount.

* * * * *